United States Patent
Todd

(10) Patent No.: US 11,265,393 B2
(45) Date of Patent: Mar. 1, 2022

(54) APPLYING A DATA VALUATION ALGORITHM TO SENSOR DATA FOR GATEWAY ASSIGNMENT

(71) Applicant: EMC IP Holding Company LLC, Hopkinton, MA (US)

(72) Inventor: Stephen J. Todd, Center Conway, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 16/163,717

(22) Filed: Oct. 18, 2018

(65) Prior Publication Data

US 2020/0128093 A1 Apr. 23, 2020

(51) Int. Cl.
| | | |
|---|---|---|
| *H04L 29/08* | (2006.01) | |
| *H04L 12/24* | (2006.01) | |
| *H04L 12/66* | (2006.01) | |
| *G06F 16/958* | (2019.01) | |
| *H04L 29/06* | (2006.01) | |
| *H04L 67/561* | (2022.01) | |
| *H04L 67/564* | (2022.01) | |
| *H04L 67/12* | (2022.01) | |
| *H04L 41/0816* | (2022.01) | |
| *H04L 69/04* | (2022.01) | |
| *H04L 67/10* | (2022.01) | |

(52) U.S. Cl.
CPC ........ *H04L 67/2804* (2013.01); *G06F 16/958* (2019.01); *H04L 12/66* (2013.01); *H04L 41/0816* (2013.01); *H04L 67/12* (2013.01); *H04L 67/2819* (2013.01); *H04L 67/10* (2013.01); *H04L 69/04* (2013.01)

(58) Field of Classification Search
CPC . H04L 67/2804; H04L 12/66; H04L 41/0816; H04L 67/12; H04L 67/2819; H04L 67/10; H04L 69/04; G06F 16/958
USPC .......................................................... 708/203
See application file for complete search history.

(56) References Cited

U.S. PATENT DOCUMENTS

| | | | | |
|---|---|---|---|---|
| 10,048,686 | B2 * | 8/2018 | Brekke | G01C 21/20 |
| 10,097,572 | B1 * | 10/2018 | Sohail | H04L 63/1425 |
| 10,210,551 | B1 * | 2/2019 | Todd | G06Q 30/0278 |
| 10,303,690 | B1 * | 5/2019 | Todd | G06F 16/22 |
| 10,419,931 | B1 * | 9/2019 | Sohail | H04L 63/1425 |
| 10,503,581 | B2 * | 12/2019 | Justin | G06F 11/0787 |
| 10,506,461 | B2 * | 12/2019 | Radmand | H04W 36/08 |

(Continued)

OTHER PUBLICATIONS

U.S. Appl. No. 15/072,557 filed in the name of Stephen Todd et al. on Mar. 17, 2016 and entitled "Metadata-Based Data Valuation."

(Continued)

*Primary Examiner* — David P Zarka
(74) *Attorney, Agent, or Firm* — Ryan, Mason & Lewis, LLP

(57) ABSTRACT

Data valuation techniques in a sensor data environment are provided. For example, a method obtains at least one sensor data element generated by at least one sensor associated with a set of one or more sensors operatively coupled to a gateway. At least one data valuation algorithm is applied to the at least one sensor data element to compute at least one value. The computed value is distributed for assignment to one or more of the gateway, the at least one sensor, and the at least one sensor data element.

19 Claims, 11 Drawing Sheets

(56) References Cited

U.S. PATENT DOCUMENTS

| | | | | |
|---|---|---|---|---|
| 10,511,696 B2* | 12/2019 | Mekuria | .................. | H04L 69/04 |
| 10,530,864 B2* | 1/2020 | Hammons | ............ | H04L 67/1023 |
| 10,536,838 B2* | 1/2020 | Stamatakis | ............ | H04L 45/122 |
| 10,671,925 B2* | 6/2020 | Chew | ........................ | G06N 5/02 |
| 2009/0002195 A1* | 1/2009 | Horvitz | ................. | G08G 1/0104 |
| | | | | 340/934 |
| 2014/0344269 A1* | 11/2014 | Dong | ...................... | H04L 67/12 |
| | | | | 707/736 |
| 2016/0094421 A1* | 3/2016 | Bali | ......................... | H04L 43/04 |
| | | | | 709/223 |
| 2017/0185078 A1* | 6/2017 | Weast | ...................... | H04W 4/80 |
| 2017/0324914 A1* | 11/2017 | Campbell | ............... | H04N 5/359 |
| 2018/0198641 A1* | 7/2018 | Gilani | ................. | H04L 41/0668 |
| 2018/0218060 A1* | 8/2018 | Guron | ................... | G06F 16/283 |
| 2018/0218242 A1* | 8/2018 | Sekine | ................. | G06K 9/4628 |
| 2018/0272963 A1* | 9/2018 | Meyhofer | .............. | G01S 13/931 |
| 2018/0288159 A1* | 10/2018 | Moustafa | ................. | H04W 4/70 |
| 2018/0349818 A1* | 12/2018 | Chan | .................. | G06Q 10/0639 |
| 2019/0042955 A1* | 2/2019 | Cahill | ....................... | G06N 5/04 |
| 2019/0096209 A1* | 3/2019 | Chen | ........................ | H04W 4/80 |
| 2019/0156496 A1* | 5/2019 | Leduc | ................. | G06K 9/00771 |
| 2019/0289026 A1* | 9/2019 | Kurian | ................ | H04L 63/1425 |
| 2020/0034548 A1* | 1/2020 | Wu | ......................... | H04L 9/3239 |

OTHER PUBLICATIONS

U.S. Appl. No. 14/863,783 filed in the name of Stephen Todd et al. on Sep. 24, 2015 and entitled "Unstructured Data Valuation."

U.S. Appl. No. 15/136,327 filed in the name of Stephen Todd et al. on Apr. 22, 2016 and entitled "Calculating Data Value Via Data Protection Analytics."

U.S. Appl. No. 15/135,790 filed in the name of Stephen Todd et al. on Apr. 22, 2016 and entitled "Data Valuation at Content Ingest."

U.S. Appl. No. 15/135,817 filed in the name of Stephen Todd et al. on Apr. 22, 2016 and entitled "Data Value Structures."

Doug Laney, "The Economics of Information Assets," The Center for Infonomics, Smarter Companies presentation, Sep. 2011, 19 pages.

Ocean Protocol Foundation With Bigchain DB GMBH and DEX PTE, LTD., "Ocean Protocol: A Decentralized Substrate for AI Data Services—Technical Whitepaper," oceanprotocol.com, bigchaindb.com, dex.sg, Version 0.9.3, Mar. 28, 2018, 51 pages.

\* cited by examiner

APPLYING A DATA VALUATION ALGORITHM TO SENSOR DATA FOR GATEWAY ASSIGNMENT

FIELD

The field relates generally to data processing and, more particularly, to data valuation techniques in a sensor data environment.

BACKGROUND

Enterprises or other entities typically have a large information technology (IT) infrastructure comprising a network of computing resources distributed across a geographic environment. These computing resources may be mobile (e.g., in a vehicle or mobile device) or remain at a fixed location (e.g., in stationary equipment). In some scenarios, these computing resources are part of an Internet of Things (IoT) network. For example, a given IoT network may include sensors that monitor one or more conditions in one or more environments in which they reside by collecting data and providing data (either raw collected data and/or data processed by the sensor) to one or more computing nodes, i.e., gateways, associated with the enterprise or other entity. By way of example only, such sensors may be part of smart devices, smart cities, smart grids, connected cars, health monitors, home automation and energy management systems, and remote industrial process control systems, just to name a few applications.

In many scenarios, data continuously streams in from sensors in an IoT network. However, the ability to effectively process and leverage such sensor data presents significant challenges to the enterprise or entity.

SUMMARY

Embodiments of the invention provide data valuation techniques in a sensor data environment.

For example, in one embodiment, a method obtains at least one sensor data element generated by at least one sensor associated with a set of one or more sensors operatively coupled to a gateway. At least one data valuation algorithm is applied to the at least one sensor data element to compute at least one value. The computed value is distributed for assignment to one or more of the gateway, the at least one sensor, and the at least one sensor data element.

In another embodiment, a method obtains, at a gateway, at least one sensor data element generated by at least one sensor associated with a set of one or more sensors operatively coupled to the gateway. The gateway also obtains at least one value computed by at least one data valuation algorithm applied to the at least one sensor data element. The gateway records the at least one value.

Advantageously, illustrative embodiments provide techniques that add valuation knowledge into a gateway by calculating the value of the sensor data of that gateway using one or more data valuation algorithms, and then cascading that value back down towards the gateway. For example, this enables the gateway to determine whether or not to transform (e.g., encrypt) the sensor data before publishing it to one or more clients and/or making a configuration change to one or more operations of the sensors.

These and other features and advantages of the invention will become more readily apparent from the accompanying drawings and the following detailed description.

DETAILED DESCRIPTION

Figure 1:
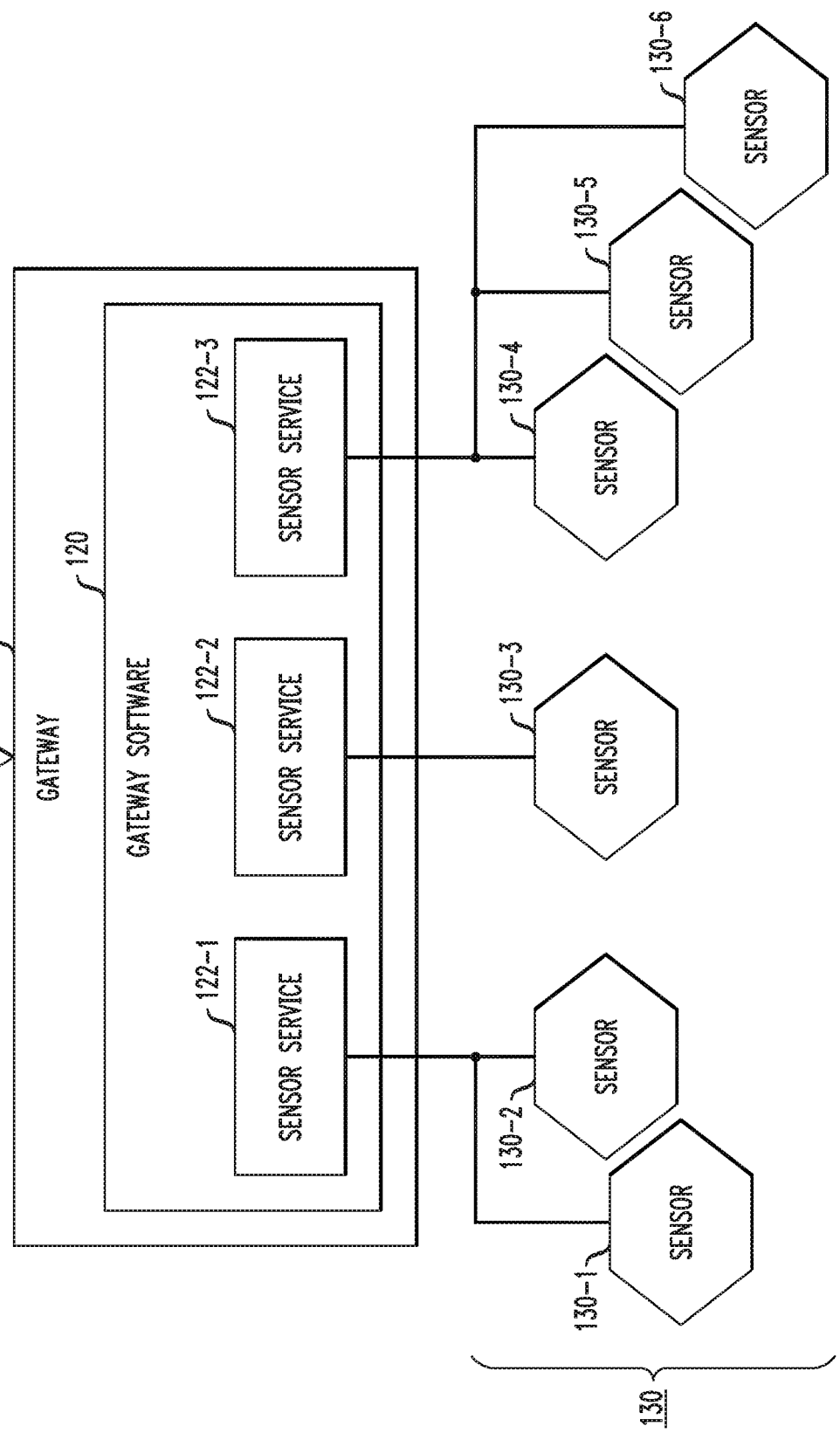
FIG. 1 illustrates a sensor data environment with a gateway computing node operatively coupled to a plurality of sensors with which one or more illustrative embodiments of the invention are implemented.

Illustrative embodiments may be described herein with reference to exemplary cloud infrastructure, data repositories, data centers, data processing systems, computing systems, information processing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "information processing system," "data lake," and the like as used herein are intended to be broadly construed so as to encompass, for example, cloud computing or storage systems, as well as other types of systems comprising distributed virtual infrastructure.

For example, some embodiments comprise a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system.

On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such information technology (IT) infrastructure.

However, a given embodiment may more generally comprise any arrangement of one or more processing devices.

As used herein, the following terms and phrases have the following illustrative meanings:

"valuation" as utilized herein is intended to be broadly construed so as to encompass, for example, a computation and/or estimation of something's worth or value; in this case, data valuation is a computation and/or estimation of the value of a data set for a given context;

"context" as utilized herein is intended to be broadly construed so as to encompass, for example, surroundings, circumstances, environment, background, settings, characteristics, qualities, attributes, descriptions, and/or the like, that determine, specify, and/or clarify something; in this case, for example, context is used to determine a value of data;

"client" as utilized herein is intended to be broadly construed so as to encompass, for example, an end user device of a computing system or some other form of cloud computing platform;

"structured data" as utilized herein is intended to be broadly construed so as to encompass, for example, data that resides in fixed fields within a document, record or file, e.g., data contained in relational databases and spreadsheets; and "unstructured data" as utilized herein is intended to be broadly construed so as to encompass, for example, data that is not considered structured data (in which case, some "semi-structured" data asset may also be considered unstructured data), e.g., documents, free form text, images, etc.; and "metadata" as utilized herein is intended to be broadly construed so as to encompass, for example, data that describes other data, i.e., data about other data.

As mentioned above, data increasingly streams in from sensors in an IoT network. It is realized herein that the value of the data coming from any particular sensor (or group of sensors) at the point of ingest is typically unknown. As a result, the attention paid to the management of both the data and the sensor is not optimized. Illustrative embodiments provide techniques for valuing IoT data in a computing environment (e.g., cloud computing environment) and cascading that value back towards the sensors and/or gateways that originally captured that data. The value of the data can then influence the management of sensors and their data for maximum effect.

Data collected from sensors is often aggregated on a gateway computing node (hereinafter, "gateway") before being forwarded on to analytic engines. The term "gateway" is intended to be broadly construed so as to encompass, for example, a computing node that enables data communications between at least two discrete networks. In illustrative embodiments, a gateway enables data communication between a network of sensors and a cloud computing platform. However, embodiments are not limited to sensor/cloud scenarios.

FIG. 1 illustrates a sensor data environment 100 with a gateway 110 operatively coupled to a plurality of sensors 130 (e.g., sensors 130-1 through 130-6) with which one or more illustrative embodiments of the invention are implemented. More particularly, FIG. 1 illustrates a configuration in which multiple sensors 130 are connected to gateway software 120. In one illustrative embodiment, gateway software 120 at least partially includes EdgeX Foundry™ (The Linux Foundation®) software which provides an open source microservices framework that allows a connection and execution environment for edge devices (e.g., sensors 130 operatively coupled to gateway 110). It is to be appreciated that embodiments are not limited to any particular gateway software product. In the implementation of gateway software 120, the import of data from a given one of the sensors 130 into gateway 110 is accomplished by a device driver referred to in FIG. 1 as a "sensor service" (referred to as "device service" in EdgeX Foundry™). In this example, there are three sensor services 122-1, 122-2, and 122-3 that can communicate with respective sensors or sensor groups. Non-limiting examples of sensors in the FIG. 1 implementation include, but are not limited to, thermostats, motion detectors, and power meters. In some embodiments, one or more sensors may also have actuator functionality. As shown in FIG. 1, sensors 130-1 and 130-2 communicate with sensor service 122-1, sensor 130-3 communicates with sensor service 122-2, and sensors 130-4, 130-5, and 130-6 communicate with sensor service 122-3. It is to be understood that the number of sensors and sensor services and their specific interconnectivity, as shown in FIG. 1, is for illustration purposes only. Alternative embodiments may have different numbers of sensors and/or sensor services connected in various alternative configurations.

Figure 2:
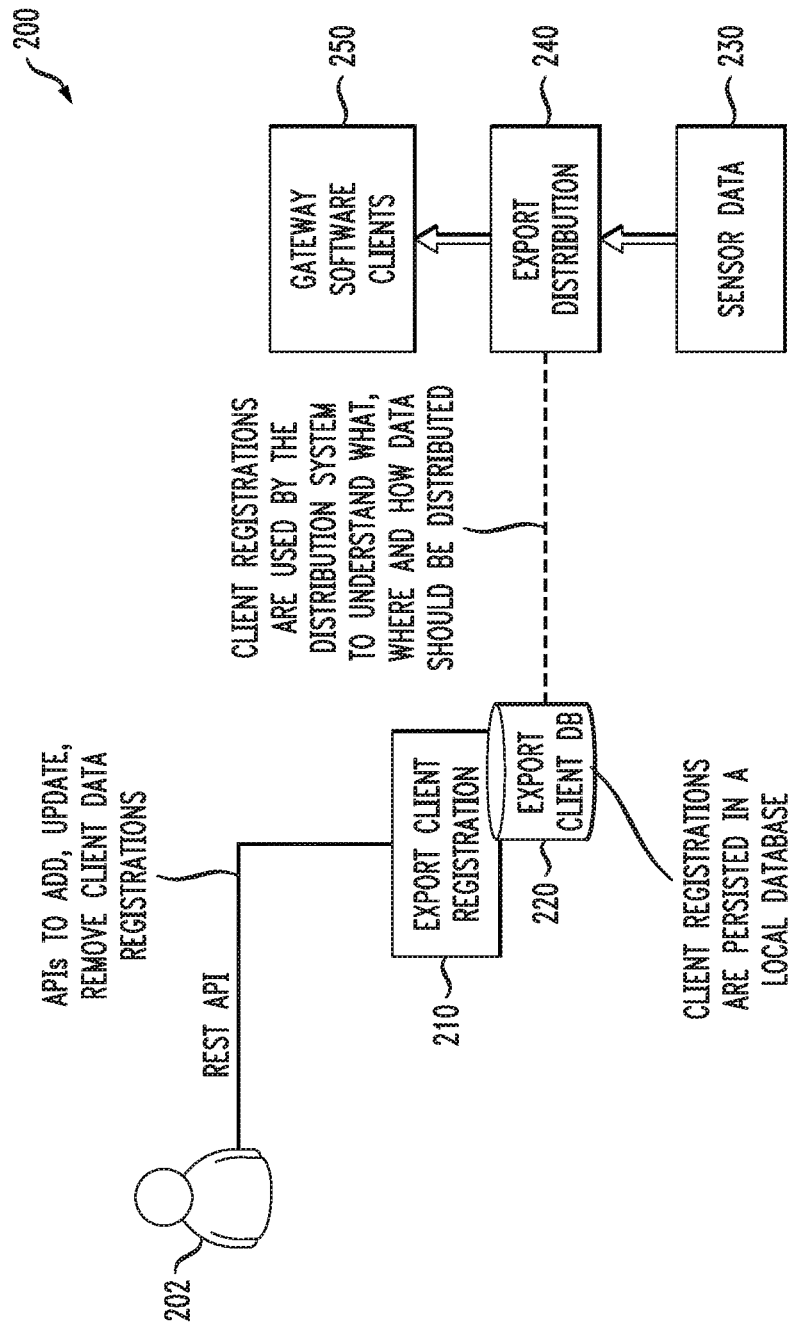
FIG. 2 illustrates a process for client registration for sensor data with which one or more illustrative embodiments of the invention are implemented.

Clients that are interested in the data imported from the plurality of sensors 130 can connect to the "northbound" interface of gateway 110 ("To/From Clients" as shown in FIG. 1) and register to receive data coming from these sensors. FIG. 2 illustrates a client registration process 200. As shown, client 202 utilizes a representational state transfer (REST) application programming interface (API) to communicate with an export client registration process 210 which locally persists client registration data on an export client database (DB) 220. More specifically, client 202 utilizes the API to add, update and/or remove a client data registration. Client registrations are then used by an export distribution system 240 (residing in or under control of gateway software 120) to understand what, where and how sensor data 230 should be distributed to registered software clients 250 (which includes client 202). Such a distribution service enables the northbound export of sensor data to other systems in or associated with the IoT ecosystem such as edge servers, data centers and/or cloud computing platforms. As this sensor data is consumed by higher-level business logic, it is realized that it has the potential to produce great value for the business. However, the lack of insight into this value results in many disadvantages.

One main problem associated with the architecture described above is that there is no feedback regarding exported data's value coming from higher-level business logic back to the gateways. This can result in any number of disadvantages that reduce business efficiency and innovation while increasing business risk, some of which are now described.

Under-Distribution of Valued Data.

In the FIG. 1 implementation described above, assume gateway 110 is forwarding data from thermostats, motion sensors, and power meters up to higher level business processes. These business processes may inspect these attributes and realize significant business savings by analyzing the power meter readings and making a business decision to act on those readings (manually or automatically) by implementing new processes that conserve a significant amount of power. The fact that "power meter readings" are extremely valuable to a particular piece of business logic, however, is not made known to additional clients. These additional clients could realize even more business benefit by monitoring power meter readings coming from the gateway.

Over-Distribution of Low-Value Data.

As a gateway continually stores and forwards data coming from sensors, there may be certain readings (e.g., thermostat readings) that over time prove to have little to no business value to higher-order business applications. This situation is not noticed and, as a result, the gateways may be wastefully importing, processing and/or overdistributing data to one or more clients without knowledge that there is no need to do so.

Improper Transformation of Sensor Data.

Figure 3:
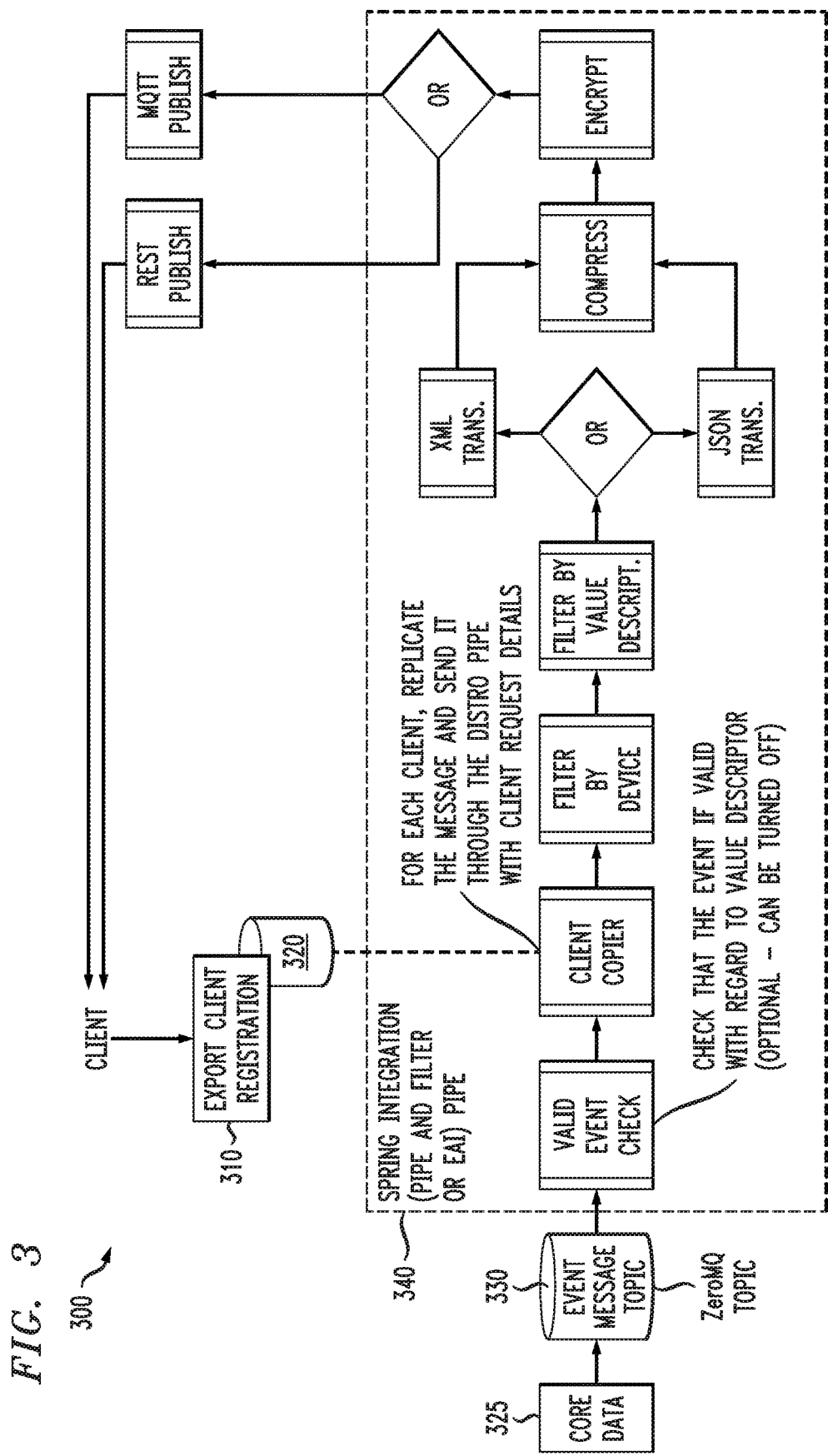
FIG. 3 illustrates a process for data transformation on sensor data with which one or more illustrative embodiments of the invention are implemented.

As data makes its way from a sensor through a gateway and to a client, it often undergoes a series of transformations before receipt by a client. FIG. 3 highlights one example of this pipelining process. More particularly, FIG. 3 shows process 300 performed in a gateway (e.g., as part of gateway software 120) with respect to clients who are registered through export client registration process 310 and database 320 (which function similar to 210 and 220, respectively, as described above in FIG. 2). Process 300 shows sensor data ("core data") 325 passing through an event message topic module 330 and entering a pipeline 340 of the gateway. An event message topic is assigned by module 330 to the sensor data 325. In this example, the pipeline 340 includes an EdgeX Foundry™ framework (left hand side of pipeline 340) and a transformation framework (right hand side of pipeline 340). The EdgeX Foundry™ framework performs a valid event check, copies the sensor data 325 for transmission to each registered client, and filters the sensor data. As shown, the data is filtered by sensor (device) and value descriptor. The term "value" as used here in the context of the EdgeX Foundry™ data model is not the same as the term "value" as in the context of a data valuation algorithm (value in the context of data valuation algorithms may be financial or non-financial in nature as it relates to a given business, e.g., "business value" as will be further explained below with regard to FIG. 5). In the context of the illustrative data model, value refers to a sensor name/value pair (which will be explained further below with regard to FIG. 4) that specifies a sensor data descriptor name and its value (e.g., current temperature and 55 degrees). The sensor data is then transformed (e.g., compression, encryption, etc.) before being sent to the registered clients. It is realized herein that a particular piece of data (e.g., motion sensor data) may represent a significant amount of negative value (e.g., risk to the company) if the data is leaked or intercepted. There is currently no way to communicate this risk to the gateway, and therefore no way to ensure that security measures are taken (e.g., mandatory encryption transformation) for data elements which are known to be high-risk to the company.

Insecure Sensors.

Data that is known to be high-risk (see above examples mentioned) could also be stolen directly from the sensor itself (e.g., if the sensor broadcasts in cleartext). There is currently no way for a corporation to query which sensors are broadcasting cleartext, high-value and/or high-risk data, nor is there a way for gateways to flag this event and raise a notification or alert.

Proper Maintenance of High-Value Sensors.

Once a piece of sensor data (sensor data element) is known to be high-value, there is currently no way to associate that value with the sensor (or class of sensors) that generated that data. Sensors that generate high-value or high-risk data should be held to a higher maintenance standard (e.g., if the sensor fails, it subsequently stops producing the high-value data). Tracking the health of the sensor (e.g., age, refreshes, etc.) is not currently tied to the value being created. Similarly, sensors that produce low-value or no-value data could be taken out of commission and no longer managed (which also reduces cost for the company).

Gateway Reconfiguration Based on Value Change.

As a gateway captures and forwards data that becomes more and more valuable, there is no existing way to notify the gateway of this change in value and reconfigure it in a way that is appropriate (e.g., tighten the security on sensors generating high-value data).

Illustrative embodiments overcome the above and other drawbacks associated with existing sensor data management. More particularly, illustrative embodiments add valuation knowledge into a gateway by calculating the value of the sensor data of the gateway using one or more valuation algorithms, and then cascading that value back down towards the gateway. Illustrative embodiments will be described below using the EdgeX Foundry™ model as an example. However, alternative embodiments are not limited to the EdgeX Foundry™ model.

Figure 4:
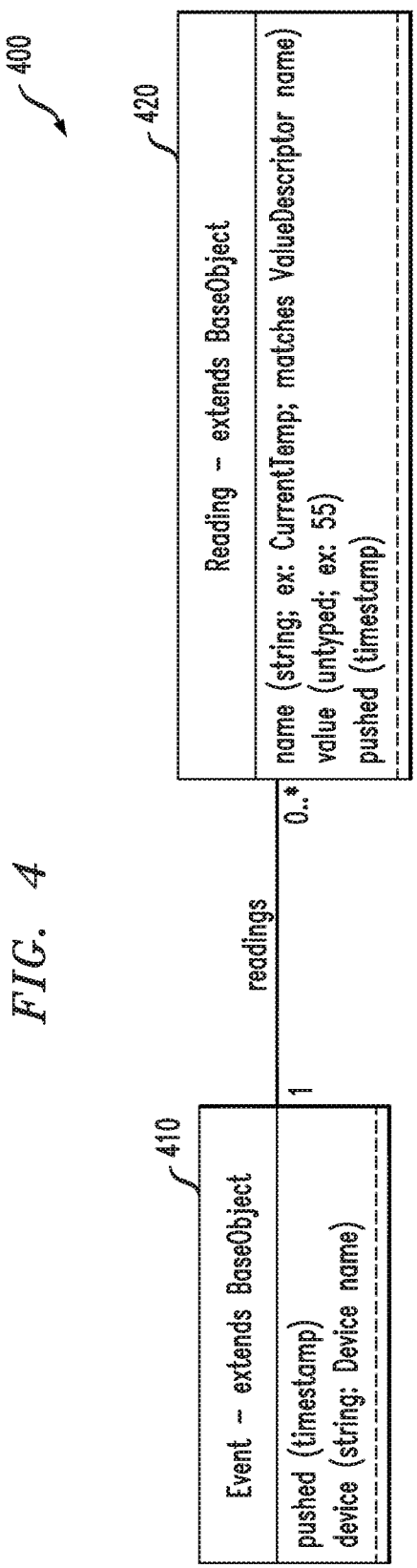
FIG. 4 illustrates a sensor data model with which one or more illustrative embodiments of the invention are implemented.

As depicted in FIG. 1, sensor data flows from the plurality of sensors 130 into sensor services 122 and then is eventually forwarded to one or more registered clients. FIG. 4 depicts a data model 400 which describes one embodiment of how the data is formatted (e.g., the EdgeX Foundry™ "core data" model).

Data model 400 illustrates an event 410 (containing a "timestamp" and coming from a given sensor with a "device name") generating zero or more "readings" 420 (name/value pairs). Gateways (e.g., gateway 110) can generate hundreds and thousands of these types of records and forward them to higher-level servers and/or cloud analytics systems. According to illustrative embodiments, these data elements are then routed into one or more valuation algorithms, as depicted in FIG. 5.

Figure 5:
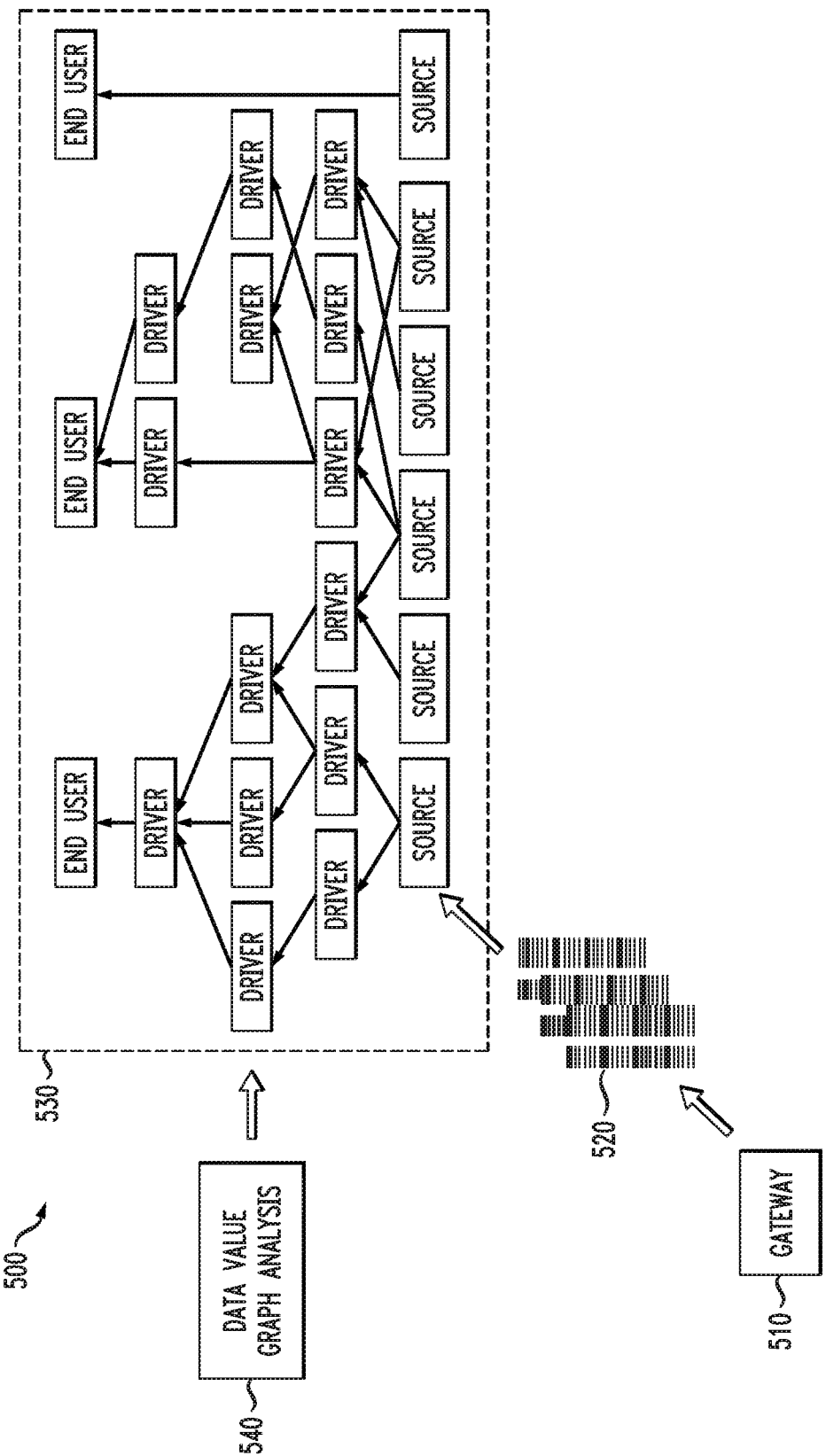
FIG. 5 illustrates a sensor data valuation system according to an illustrative embodiment of the invention.

As shown in FIG. 5, a sensor data valuation system environment 500 comprises a gateway 510 that generates sensor data elements 520 (e.g., readings 420) and provides them to a graphical-based data valuation framework 530 which is accessible by a data value graph analysis module 540, as will be further explained below. The data valuation framework depicted as 530 in FIG. 5 is an example of a content workflow valuation algorithm that records the workflow and usage of content. In this embodiment, valuation framework 530 represents the application of business logic and/or other data analytics on the sensor data elements 520 and assignment of value (measure of valuation, as used here) to a piece of content based on such context. More particularly, valuation framework 530 and analysis module 540 track business logic/data analytic activity in the form of a directed acyclic graph and assigns top-level business value to end user results (e.g., how much money was made or saved by using the data). This value is then cascaded down through intermediate (driver) data to the original "source"

data (sensor data elements 520) used to generate the business value. By way of example, content workflow valuation techniques are further described in U.S. Ser. No. 15/072,557, filed on Mar. 17, 2016 and entitled "Metadata-based Data Valuation" and U.S. Ser. No. 15/135,817, filed on Apr. 22, 2016 and entitled "Data Value Structures," the disclosures of which are incorporated by reference herein in their entireties.

It is to be appreciated that the valuation framework 530 and analysis module 540 represent only one example of a valuation algorithm that can be applied to the sensor data elements 520. One or more other valuation algorithms, as well as multiple ones, can be applied in various alternative embodiments. For example, alternative valuation frameworks that can be employed to generate valuation for sensor data elements 520 include, but are not limited to:

content processing valuation techniques as described in U.S. Ser. No. 14/863,783, filed on Sep. 24, 2015 and entitled "Unstructured Data Valuation," the disclosure of which is incorporated by reference herein in its entirety;

data protection valuation techniques as described in U.S. Ser. No. 15/136,327, filed on Apr. 22, 2016 and entitled "Calculating Data Value Via Data Protection Analytics," the disclosure of which is incorporated by reference herein in its entirety; and content ingest valuation techniques as described in U.S. Ser. No. 15/135,790, filed on Apr. 22, 2016 and entitled "Data Valuation at Content Ingest," the disclosure of which is incorporated by reference herein in its entirety.

Other valuation algorithms can be used to provide further valuation metrics. By way of non-limiting example, one or more of the data valuation models described in D. Laney, "The Economics of Information Assets," The Center for Infonomics, Smarter Companies presentation, September 2011, may be employed as a data valuation algorithm used by one or more illustrative embodiments. Such valuation models include a set of non-financial models and set of financial models. The non-financial models include: (i) an intrinsic value of information (IVI) model, which represents a measure of a value of the correctness, completeness, and exclusivity (scarcity) of the data set; (ii) a business value of information (BVI) model, which represents a measure of a value of the sufficiency and relevance of the data set for specific purposes; and (iii) a performance value of information (PVI) model, which represents a measure of a value of how the data set affects key business drivers. The financial models include: (i) a cost value of information (CVI) model, which represents a measure of a value of the cost of losing the data set; (ii) a market value of information (MVI) model, which represents a measure of a value of the amount that could be obtained by selling or trading the data set; and (iii) an economic value of information (EVI) model, which represents a measure of a value of how the data set contributes to a financial bottom line.

Regardless of the valuation algorithm used, in one or more illustrative embodiments, an end result is that a file (source data that is filled with sensor data) now has a valuation score(s) associated with it (e.g., financial and/or numerical).

Figure 6:
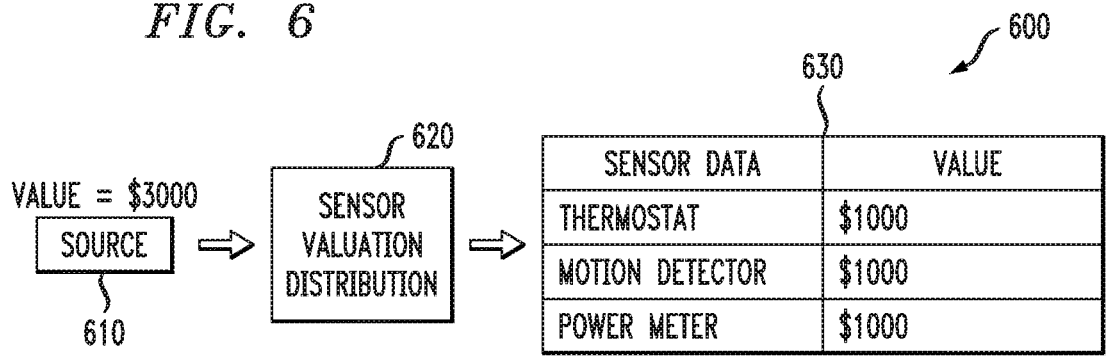
FIG. 6 illustrates a process for distribution of value to sensor data according to an illustrative embodiment of the invention.

Once a file containing sensor data has been valued, a separate algorithm inspects that value and distributes it amongst all contributing sensor values. FIG. 6 illustrates a process 600 for distribution of value to sensor data. Assume that a source file 610 with sensor data is valued by the valuation framework 530 in FIG. 5 (or some other valuation framework) as having a value of $3000. In this case, a sensor valuation distribution algorithm 620 equally distributes and assigns value among different sensor readings that were used to produce business value as depicted in table 630 (i.e., thermostat data/$1000, motion detector data/$1000, and power meter data/$1000). Alternatively, if thermostat data is more heavily leveraged (or there were more readings), the value can be weighted more heavily to the thermostat data (e.g., $2000) instead of the motion detector data and/or the power meter data (which can each be assigned $500).

If the overall source value is not financial but is instead a ranking or prioritization (e.g., the business value or above-mentioned BVI score for a piece of data), this ranking is similarly distributed amongst the readings.

Instead of (or in addition to) assigning value to sensor data, in one or more illustrative embodiments, value is also calculated for the physical sensors themselves, and/or the gateways that are forwarding the particular data. This allows an administrator to know which hardware devices are generating the most valuable data across their IoT ecosystem.

Figure 7:
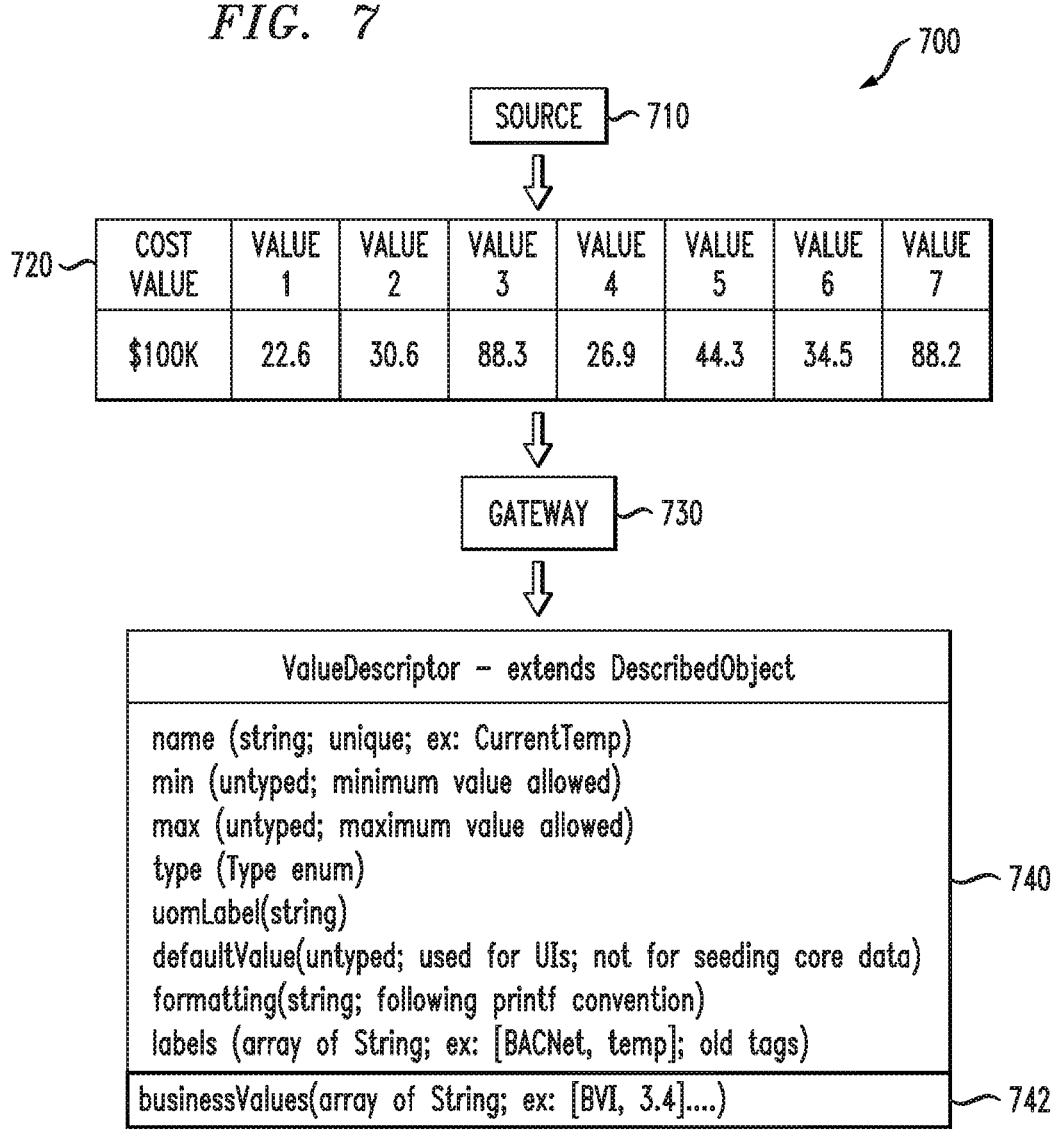
FIG. 7 illustrates a process for flow of sensor data value to a gateway computing node according to an illustrative embodiment of the invention.

Once value has been calculated for IoT data, this value is recorded at the gateway layer. FIG. 7 illustrates a process flow 700 of values (e.g., one or more statements of business value for a sensor or sensor data) back to a gateway. More particularly, in this example, valuation algorithms are applied to source file 710 resulting in an array of values 720 (as depicted by cost and values 1-7 in the table). The gateway 730 receives the array of values 720 and updates its metadata to store this array of values 720 in metadata structure 740 by the addition of a "business Values" field 742 in the metadata (e.g., storing a calculated value for BVI as 3.4, as well as any other data valuation results).

The ability for a client to push values back to a gateway for storage according to illustrative embodiments enables a wide variety of other features to be implemented. FIG. 7 highlights only one example in the form of an EdgeX Foundry™ "Value Descriptor" class which represents different forms of metadata that can be kept about an object. The contents of this value descriptor are accessed (in the case of EdgeX Foundry™) by one or more other microservices during their operation.

Figure 8:
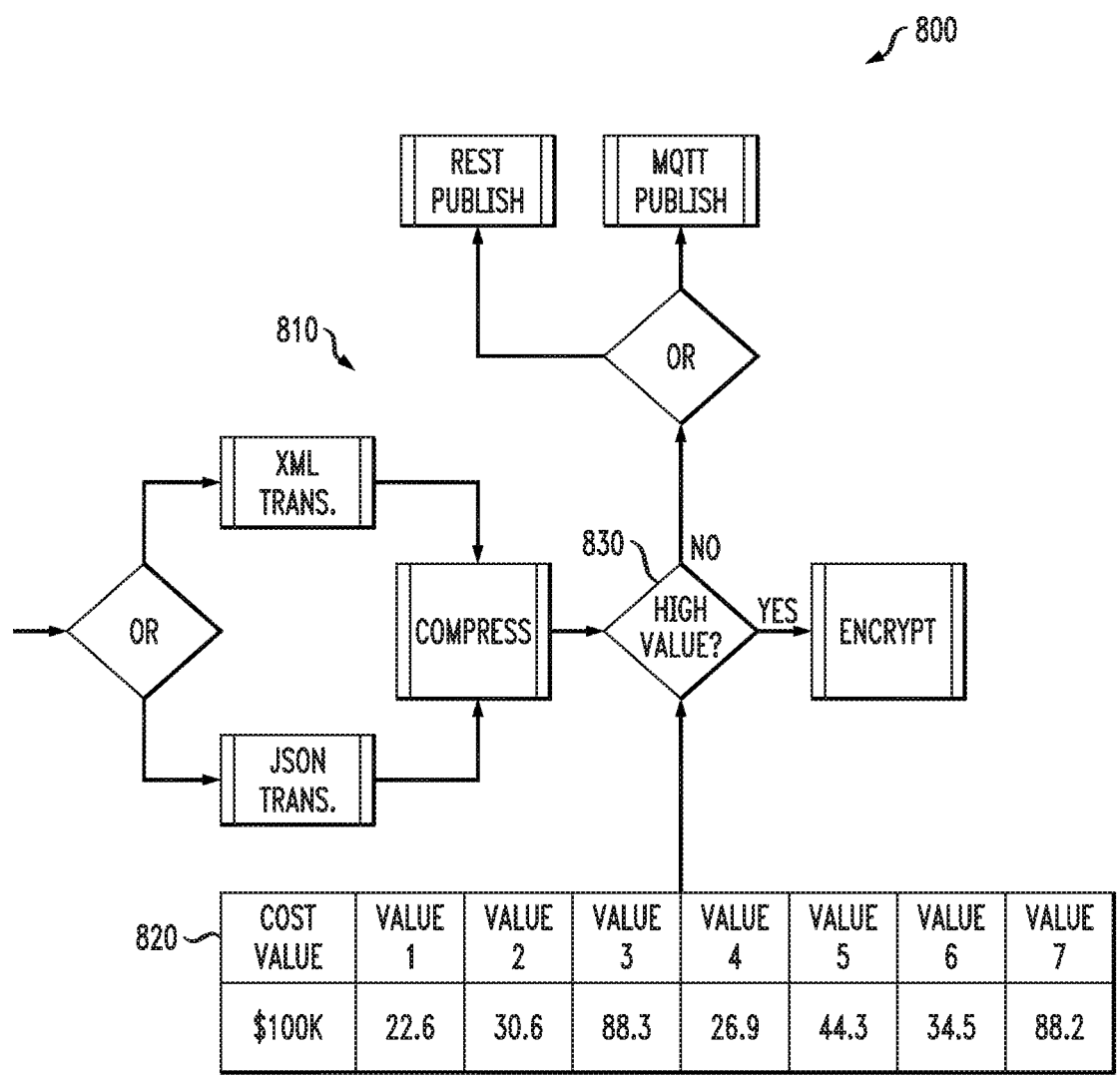
FIG. 8 illustrates a process for sensor value querying according to an illustrative embodiment of the invention.

As data flows into a gateway from a sensor, in one or more embodiments, the imported sensor data is inspected and treated appropriately based on its value (data valuation algorithm results 720 represented as business Values 742). For example, the transformation flow depicted in FIG. 3 can now be modified for conditional actions based on value. FIG. 8 illustrates an example 800 of modification of a transformation flow 810 (e.g., the thermostat flow in FIG. 3) when an encryption transform is used for all sensor data exceeding a threshold value (e.g., the cost value of sensor data crosses $99K for example). That is, based on the valuation data 820 computed for the sensor data being processed by the transformation flow 810, a determination 830 is made whether or not the sensor data has a value above (or at or above) a predetermined value. If above the predetermined value (e.g., $99K), then the sensor data is encrypted before being published to the one or more registered clients, otherwise the sensor data is not encrypted before publication. Since the cost value of the data is $100K in table 820 and thus above the $99K threshold, the sensor data is deemed high-value and is encrypted. Such valuation data 820 can be used to enable other transformations.

Many frameworks support an event notification when a given value changes. This allows a configuration service to register a "watcher" for business valuation scores. Thus, in one or more illustrative embodiments, key-business value pairs are monitored for changes, and when the data changes a piece of code is executed. Non-limiting examples of configuration changes triggered by a change in business value are as follows: (i) the value of data coming off of a sensor is continually lowering and the polling frequency is changed from every 5 minutes to every hour; (ii) the value of data coming off of a sensor has increased dramatically and the decision is made to continually check whether or not the sensor is running the latest firmware available.

Furthermore, in one or more illustrative embodiments, the business value of the aggregate data of a gateway is calculated by executing a service that iterates through all sensors and adds up the sum total of the individual sensor valuation measures. This "gateway data value" can be queried throughout a gateway ecosystem to determine the value of IoT data across the entirety of all gateways. These aggregation processes are illustrated in FIGS. 9 and 10.

Figure 9:
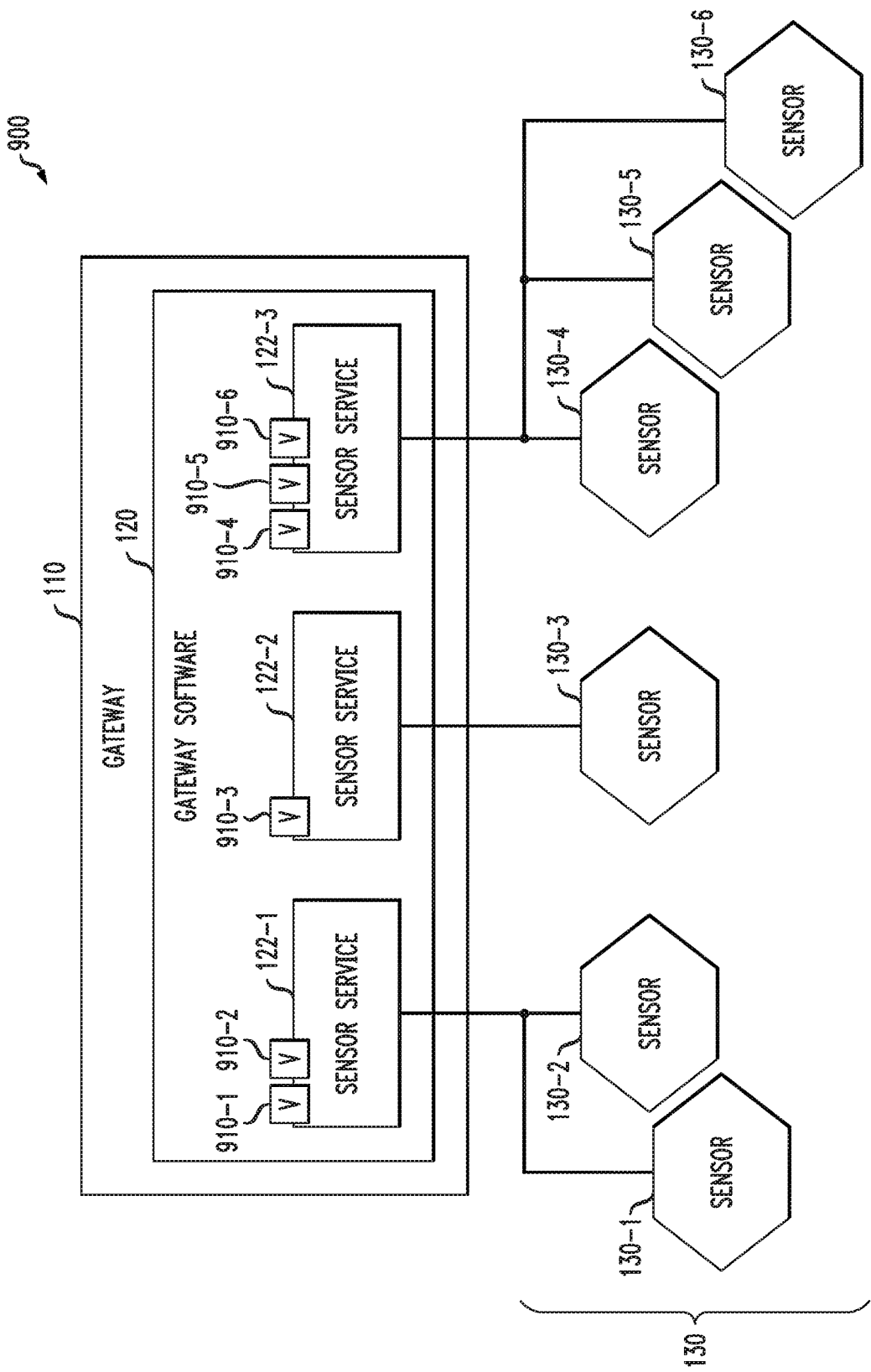
FIG. 9 illustrates a process for calculating aggregate gateway value according to an illustrative embodiment of the invention.

FIG. 9 illustrates a process 900 of calculating aggregate value for a given gateway. For example, using the gateway 110 from FIG. 1, note that each sensor service 122 has individual business values for each sensor 130 it handles. These business values 910-1 through 910-6 are aggregated (added or statistically combined in some other way) for gateway 110.

Figure 10:
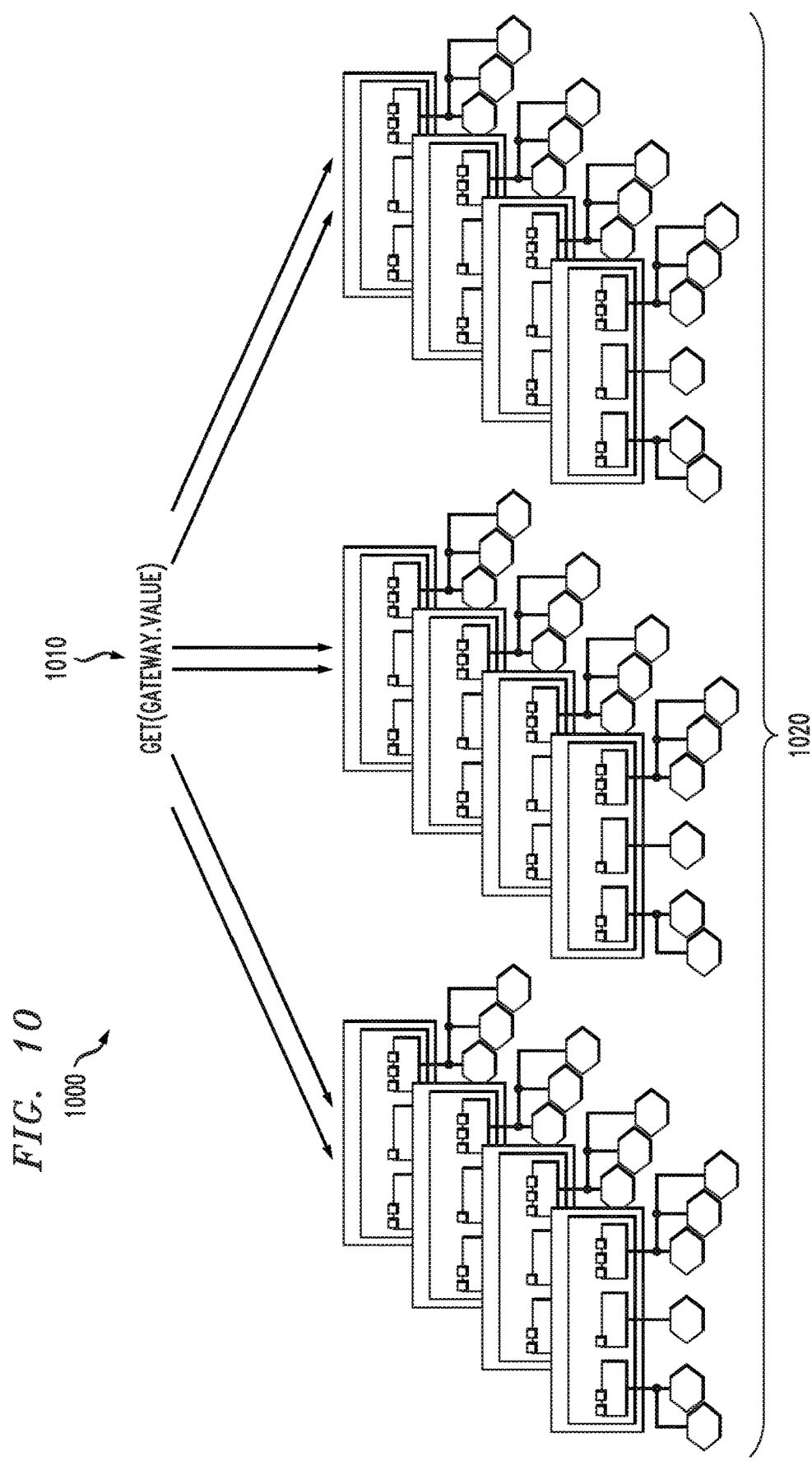
FIG. 10 illustrates a value-based view of data across an IoT ecosystem according to an illustrative embodiment of the invention.

FIG. 10 then illustrates an example 1000 whereby a process 1010 obtains the aggregated business value from each of a plurality of gateways 1020. As such, business value from each gateway is accessed and aggregated across the entire IoT sensor ecosystem. This ecosystem view of data allows an administrator or an enterprise to monitor the distributed value represented by the data streaming in from all sensors. Note that while the term "business value" is used herein to illustratively describe data valuation algorithm results, the value generated by such algorithms can be value other than business value. Again, this type of value is different than the value of a reading generated by a sensor.

Figure 11A:
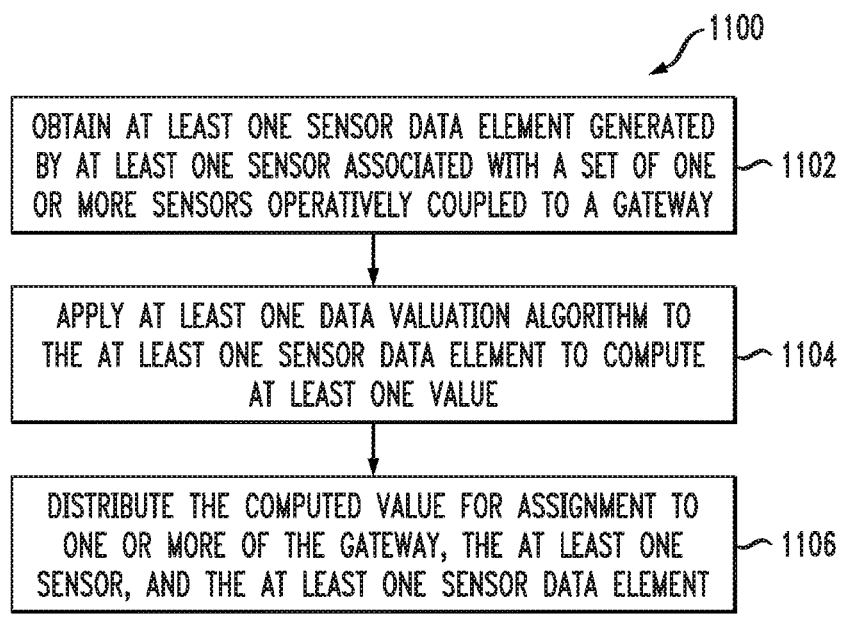
FIG. 11A illustrates a methodology for sensor data valuation according to an illustrative embodiment of the invention.

FIG. 11A illustrates a methodology for sensor data valuation according to an illustrative embodiment of the invention. As shown in methodology 1100, step 1102 obtains at least one sensor data element generated by at least one sensor associated with a set of one or more sensors operatively coupled to a gateway. Step 1104 applies at least one data valuation algorithm to the at least one sensor data element to compute at least one value. Step 1106 distributes the computed value for assignment to one or more of the gateway, the at least one sensor, and the at least one sensor data element.

Figure 11B:
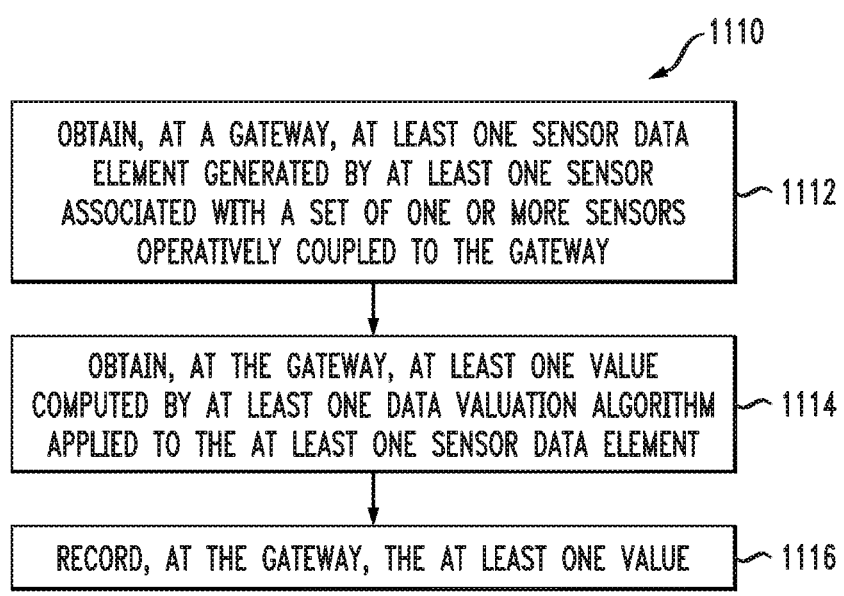
FIG. 11B illustrates a methodology for sensor data management according to an illustrative embodiment of the invention.

FIG. 11B illustrates a methodology for sensor data management according to an illustrative embodiment of the invention. As shown in methodology 1110, step 1112 obtains, at a gateway, at least one sensor data element generated by at least one sensor associated with a set of one or more sensors operatively coupled to the gateway. Step 1114 obtains, at the gateway, at least one value computed by at least one data valuation algorithm applied to the at least one sensor data element. Step 1116 records, at the gateway, the at least one value.

Figure 12:
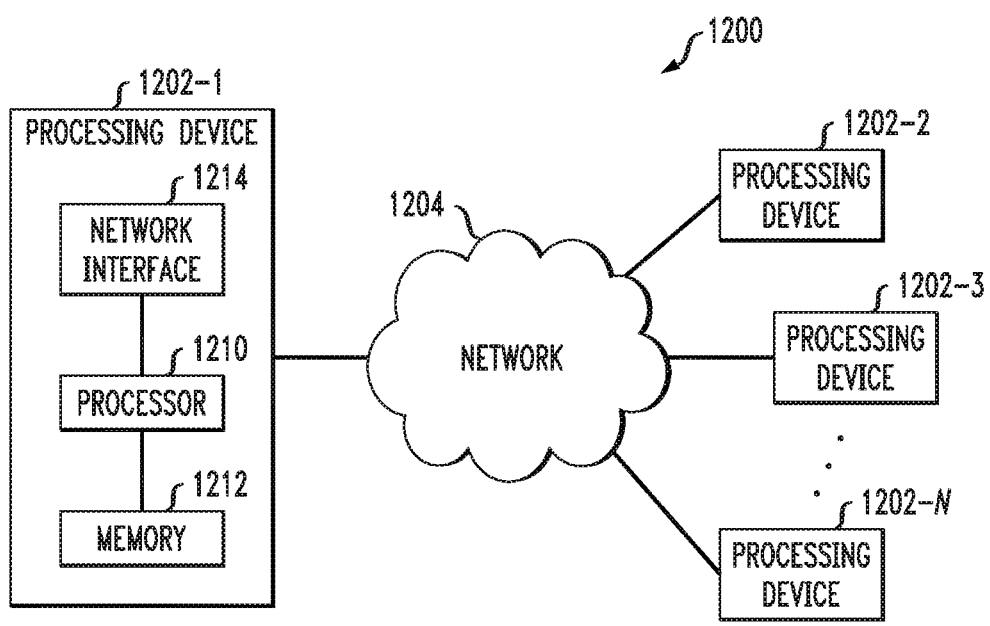
FIG. 12 illustrates a processing platform used to implement a sensor data valuation and management system according to an illustrative embodiment of the invention.

As an example of a processing platform on which a sensor data valuation and management environment (as shown in FIGS. 1-11B) according to illustrative embodiments can be implemented is processing platform 1200 shown in FIG. 12. The processing platform 1200 in this embodiment comprises a plurality of processing devices, denoted 1202-1, 1202-2, 1202-3, . . . 1202-N, which communicate with one another over a network 1204. It is to be appreciated that the data valuation methodologies described herein may be executed in one such processing device 1202, or executed in a distributed manner across two or more such processing devices 1202. Thus, the framework environment may be executed in a distributed manner across two or more such processing devices 1202. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 12, such a device comprises at least one processor and an associated memory, and implements one or more functional modules for instantiating and/or controlling features of systems and methodologies described herein. Multiple elements or modules may be implemented by a single processing device in a given embodiment.

The processing device 1202-1 in the processing platform 1200 comprises a processor 1210 coupled to a memory 1212. The processor 1210 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1210. Memory 1212 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1212 may comprise electronic memory such as random access memory (RAM), read-only memory (ROM) or other types of memory, in any combination. The one or more software programs when executed by a processing device, such as the processing device 1202-1, causes the device to perform functions associated with one or more of the components/steps of system/methodologies in FIGS. 1-11B. One skilled in the art would be readily able to implement such software given the teachings provided herein. Other examples of processor-readable storage media embodying embodiments of the invention may include, for example, optical or magnetic disks.

Processing device 1202-1 also includes network interface circuitry 1214, which is used to interface the device with the network 1204 and other system components. Such circuitry may comprise conventional transceivers of a type well known in the art.

The other processing devices 1202 (1202-2, 1202-3, . . . 1202-N) of the processing platform 1200 are assumed to be configured in a manner similar to that shown for processing device 1202-1 in the figure.

The processing platform 1200 shown in FIG. 12 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 1200. Such components can communicate with other elements of the processing platform 1200 over any type of network, such as a wide area network (WAN), a local area network (LAN), a satellite network, a telephone or cable network, or various portions or combinations of these and other types of networks.

Furthermore, it is to be appreciated that the processing platform 1200 of FIG. 12 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the sensor data valuation and management system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
obtaining at least one sensor data element generated by at least one sensor associated with a set of two or more sensors operatively coupled to a gateway;
applying at least one data valuation algorithm to the at least one sensor data element to compute at least one valuation of the at least one sensor data element for a given context;
assigning the at least one computed valuation to one or more of the gateway, the at least one sensor, and the at least one sensor data element;
modifying one or more transformations applied to the at least one sensor data element by at least one of the gateway and the at least one sensor based at least in part on the at least one computed valuation;
determining a gateway valuation for the gateway, the gateway valuation comprising a combination of the valuation of the at least one sensor data element and valuations of one or more other sensor data elements generated by one or more other sensors in the set of two or more sensors operatively coupled to the gateway; and
aggregating the gateway valuation for the gateway with one or more additional gateway valuations respectively associated with one or more additional gateways each coupled to an additional set of two or more sensors;
wherein the method is performed by at least one processing device comprising a processor and a memory.

2. The method of claim 1, further comprising aggregating valuations respectively computed for sensor data elements generated by at least two sensors in the set of two or more sensors operatively coupled to the gateway.

3. The method of claim 1, wherein the at least one data valuation algorithm comprises a process for attributing at least one of a financial value and a non-financial value to the at least one sensor data element.

4. The method of claim 1, wherein the at least one processing device performing the obtaining, applying and assigning steps is part of a computing device separate from the gateway.

5. The method of claim 4, wherein the computing device is part of a cloud computing platform.

6. The method of claim 1, wherein the at least one processing device performing the obtaining, applying and assigning steps is part of the gateway.

7. The method of claim 1, wherein the gateway and the set of two or more sensors are part of an Internet of Things (IoT) ecosystem.

8. An apparatus comprising:
at least one processor operatively coupled to at least one memory and configured to:
obtain at least one sensor data element generated by at least one sensor associated with a set of two or more sensors operatively coupled to a gateway;
apply at least one data valuation algorithm to the at least one sensor data element to compute at least one valuation of the at least one sensor data element for a given context;
assign the at least one computed valuation to one or more of the gateway, the at least one sensor, and the at least one sensor data element;
modify one or more transformations applied to the at least one sensor data element by at least one of the gateway and the at least one sensor based at least in part on the at least one computed valuation;
determine a gateway valuation for the gateway, the gateway valuation comprising a combination of the valuation of the at least one sensor data element and valuations of one or more other sensor data elements generated by one or more other sensors in the set of two or more sensors operatively coupled to the gateway; and aggregate the gateway valuation for the gateway with one or more additional gateway valuations respectively associated with one or more additional gateways each coupled to an additional set of two or more sensors.

9. The apparatus of claim 8, wherein the at least one processor is further configured to:

aggregate valuations respectively computed for sensor data elements generated by at least two sensors in the set of two or more sensors operatively coupled to the gateway.

10. The apparatus of claim 8, wherein the at least one data valuation algorithm comprises a process for attributing at least one of a financial value and a non-financial value to the at least one sensor data element.

11. The apparatus of claim 8, wherein the at least one processor performing the obtaining, applying and assigning is part of a computing device separate from the gateway and wherein the computing device is part of a cloud computing platform.

12. The apparatus of claim 8, wherein the at least one processor performing the obtaining, applying and assigning steps is part of the gateway.

13. The apparatus of claim 8, wherein the gateway and the set of two or more sensors are part of an Internet of Things (IoT) ecosystem.

14. An article of manufacture comprising a processor-readable non-transitory storage medium having encoded therein executable code of one or more software programs, wherein the one or more software programs when executed by at least one processing device implement the steps of:

obtaining at least one sensor data element generated by at least one sensor associated with a set of two or more sensors operatively coupled to a gateway;

applying at least one data valuation algorithm to the at least one sensor data element to compute at least one valuation of the at least one sensor data element for a given context;

assigning the at least one computed valuation to one or more of the gateway, the at least one sensor, and the at least one sensor data element;

modifying one or more transformations applied to the at least one sensor data element by at least one of the gateway and the at least one sensor based at least in part on the at least one computed valuation;

determining a gateway valuation for the gateway, the gateway valuation comprising a combination of the valuation of the at least one sensor data element and valuations of one or more other sensor data elements generated by one or more other sensors in the set of two or more sensors operatively coupled to the gateway; and aggregating the gateway valuation for the gateway with one or more additional gateway valuations respectively associated with one or more additional gateways each coupled to an additional set of two or more sensors.

15. The article of manufacture of claim 14, wherein the one or more software programs when executed by the at least one processing device is further configured to implement the step of:

aggregating valuations respectively computed for sensor data elements generated by at least two sensors in the set of two or more sensors operatively coupled to the gateway.

16. The article of manufacture of claim 14, wherein the at least one data valuation algorithm comprises a process for attributing at least one of a financial value and a non-financial value to the at least one sensor data element.

17. The article of manufacture of claim 14, wherein the at least one processing device performing the obtaining, applying and assigning is part of a computing device separate from the gateway and wherein the computing device is part of a cloud computing platform.

18. The article of manufacture of claim 14, wherein the at least one processing device performing the obtaining, applying and assigning is part of the gateway.

19. The article of manufacture of claim 14, wherein the gateway and the set of two or more sensors are part of an Internet of Things (IoT) ecosystem.

* * * * *